June 26, 1951     E. M. SPLAINE     2,558,499

OPHTHALMIC MOUNTING

Filed Oct. 14, 1948

INVENTOR.
EDWARD M. SPLAINE
BY
Louis L. Gagnon
ATTORNEY

Patented June 26, 1951

2,558,499

UNITED STATES PATENT OFFICE 2,558,499

OPHTHALMIC MOUNTING

Edward M. Splaine, Southbridge, Mass., assignor to American Optical Company, Southbridge, Mass., a voluntary association of Massachusetts Application October 14, 1948, Serial No. 54,410

4 Claims. (Cl. 88—41)

This invention relates to ophthalmic mountings and has particular reference to an improved lens supporting construction for such mountings and method of making the same.

One of the principal objects of the invention is to provide an ophthalmic mounting comprising a central bridge portion supporting lens holding means adjacent the depending side portions thereof and having long and slender bar-like portions extending outwardly of the sides of the bridge portion shaped substantially to the upper contour shape of the lenses and terminating in rearwardly extending end portions to which temples may be pivotally connected, said long and slender bar-like portions each having a plate-like member secured thereto adjacent the nasal sides thereof by a spacer member for spacing said plate-like member from its respective bar-like portion a distance substantially equal to the thickness of the lens, said plate-like members being shaped substantially to follow the upper contour shape of the lens and having a portion adjacent the temporal end thereof extending rearwardly and secured to the rearwardly extending end of the bar-like portion in side surface overlapping and blended relation therewith and having a vertical dimension substantially equal to that of the vertical dimension of the respective end portion of the bar-like member.

Another object of the invention is to provide a lens supporting structure for the lenses of an ophthalmic mounting of the above character embodying spaced forward and rear portions shaped substantially to follow the upper contour shapes of the lenses with the rear portions being shaped to overlie the rear surfaces of the lenses with their upper surfaces in substantially flush relation with the adjacent upper edges of the lenses and with the front portions having a part overlying the front surfaces of the lenses and a substantially right-angular part overlying the upper edge surfaces of the lenses with the intersection line of said right-angular portions being shaped substantially to the contour shapes of the upper edges of the lenses, said portions, adjacent the nasal sides thereof, being connected by a spacer member separating said rear and front portions a distance apart substantially equal to the thickness of the adjacent edges of the lenses and having end portions on the temporal sides thereof curving rearwardly and secured in side surface overlapping blended relation with each other outwardly of the contour of the adjacent edges of the respective lenses and with the vertical dimensions of said overlapping portions being substantially equal and with the front portion lending itself to the provision of decorative means of different desirable configurations.

Another object is to provide an ophthalmic mounting of the above character with lens holding means only on the nasal sides thereof and embodying resilient means for yieldingly supporting the lenses with the upper edges thereof lying between spaced rear and forward portions shaped substantially to follow the upper contour shapes of the lenses, with said front and rear portions forming channel-like means for receiving the upper edges of the lenses and with the said holding means resiliently retaining the lenses within said channel-like means.

Another object is to provide temple supporting members comprising bar-like members shaped to overlie the rear surfaces of the lenses and having spaced substantially parallel reinforcing means secured thereto and shaped to overlie the front surfaces of the lenses and to follow substantially the upper contour shapes of the lenses throughout the width of the lenses with said reinforcing means affording means for receiving decorative treatment of different desired designs and configuration and having its temporal ends extending rearwardly and secured to the temple supporting ends of the bar-like member in blended relation therewith.

Other objects and advantages of the invention will become apparent from the following description taken in connection with the accompanying drawings and it will be apparent that many changes in the details of construction, arrangements of parts and method may be made without departing from the spirit of the invention as expressed in the accompanying claims. I, therefore, do not wish to be limited to the exact details of construction, arrangement of parts and method shown and described as the preferred form only has been given by way of illustration.

Referring to the drawings.

Figure 1:
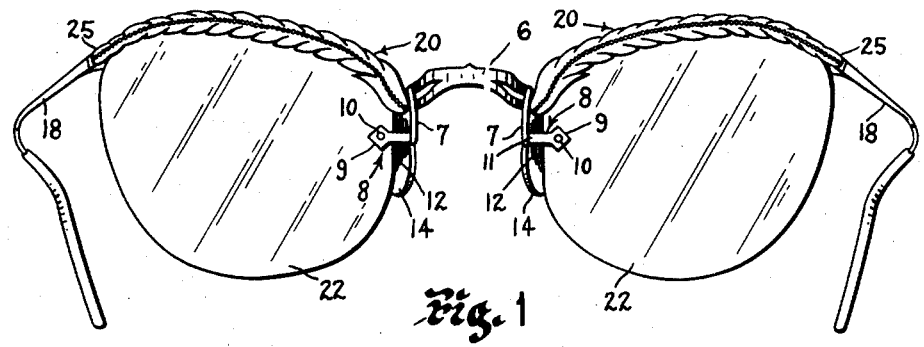
Fig. 1 is a front elevational view of the device embodying the invention.

The present invention is directed to the forming of a lens supporting structure embodying a plurality of unique features combined in such a manner as to accomplish the desired mechanical results in a simple and efficient manner while providing means to which a decorative treatment may be applied while retaining all of the desired mechanical features.

One of the features of the present invention is that of connecting the lenses to the mounting on the nasal sides only of the bridge member in such a manner that the lenses are resiliently supported so as to be free to absorb shock and strain applied in the direction of the plane of the lenses, and to further provide spaced temple supporting members shaped to follow substantially the upper contour shapes of the respective lenses and which provide channel-like means overlying the front and rear surfaces of the lenses adjacent the tops thereof to support said lenses against forward or rearward deflection thereof in a direction substantially normal to the plane of the lenses, with the forward portion affording means to which decorative treatment may be applied, the channel-like means embodying spaced portions provided with end portions extending outwardly of the temporal edges of the lenses and rearwardly thereof and secured in side surface overlapping relation with each other to afford a rigid mechanical connection while causing the parts to have a pleasing, blended relation with each other, and to which the temples may be pivotally secured.

Referring more particularly to the drawings wherein like characters of reference designate like parts throughout the several views, the device embodying the invention comprises a central bridge member 6 having depending side portions 7. Secured to the depending side portions 7, there is provided a lens strap 8 having a perforated end 9 adapted to be aligned with a connection opening in the lens and in which suitable lens connection means 10 may be secured. The lens straps 8 each have a base portion 11 to which a plurality of nested blade springs 12 are attached whereby the said blade springs 12 will engage the edge of the lens and will resiliently limit the pivotal movement of the lens about the axis formed by the connection means 10 while absorbing any shock and strain which may be imposed on the lens in the direction of the vertical plane thereof.

The depending side portions 7 of the bridge also provide means to which rearwardly extending pad supporting arms 13 are attached and which in turn pivotally or rigidly support suitable nose pads 14 for engagement with the nose of the wearer.

Figure 3:
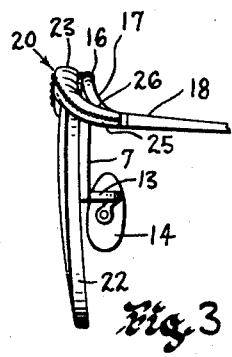
Fig. 3 is a side view thereof.
Figure 4:
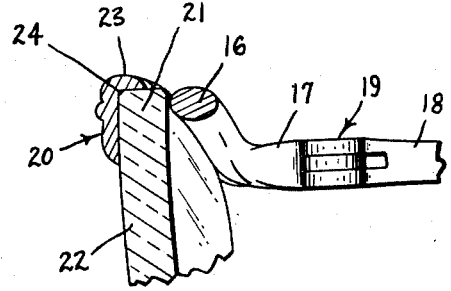
Fig. 4 is an enlarged fragmentary sectional view taken as on line 4—4 of Fig. 2 and looking in the direction indicated by the arrows.
Figure 5:
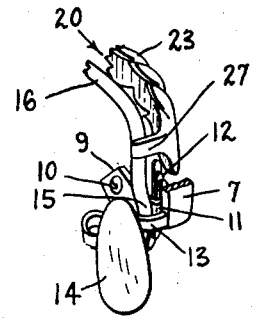
Fig. 5 is a fragmentary perspective view of the assembly at the nasal side of the mounting.

The lens supporting structures, as shown best in Figs. 3 and 5, also each have secured thereto the inner end 15 of a long and slender bar-like member 16 shaped substantially to the shape of the upper contour edge of the lens and to overlie the rear side surface of the lens, as shown best in Fig. 4. The long and slender bar-like member 16 has an outwardly and rearwardly extending end portion 17 terminating in a temple pivotal connection to which a temple 18 may be pivotally connected as illustrated at 19. The end 15 of the member 16 may be either secured to the pad supporting arm 13 adjacent its connection with the depending portions 7 or may be secured to an adjacent rear side surface of the lens strap 8 or partially to both, as desired, by soldering, welding or the like. The bar-like member 16 is of such cross-sectional dimension as to render said bar-like member relatively rigid although adjustable to compensate for slight changes in the cupping curvature of different lenses.

These bar-like members 16 provide a backing support for resisting shock on the lenses directed from the front of the lenses and will prevent tilting the lenses rearwardly relative to the lens straps 8, thereby preventing strain at said latter location and possible breakage of the lens due to shock received thereby.

To provide means resisting shock or strain on the lenses directed from the rear thereof, the bar-like members 16 have secured thereto spaced longitudinally extending relatively long and narrow reinforcing plate members 20. The plate members 20, in general, are shaped to overlie the front surfaces of the lenses and are spaced relative to the bar-like member 16 an amount sufficient to receive the adjacent edge 21 of the lenses 22 therebetween. The plate-like members 20 are provided with right-angular portions 23 shaped to overlie the upper contour edge of the lens to increase the rigidity of said plate-like members 20 and to function cooperatively therewith and with the bar-like members 16 to form channel-like means for receiving the adjacent edge of the lens. The line of intersection 24 of the inner surfaces of the frontal portion of the plate member 20 and the right-angular portions 23 is shaped in a direction longitudinally of said portion to follow substantially the upper contour shape of the lens throughout the width thereof, and the said plate members 20 including right-angular portions 23 continue outwardly of the temporal edges of the lenses a distance sufficient to cause said line of intersection 24 to extend outwardly and rearwardly transversely of the temporal edges of the lenses and terminate in outwardly and rearwardly extending portions 25, see Figs. 2 and 3, which are shaped to overlie the outer side surfaces of the rearwardly extending portions 17 of the bar-like members 16 and to have a tapering blend therewith. The said portions 25 are secured in overlapping side surface relation with the portion 17 by soldering, welding or the like and, as shown in Fig. 3, the said portions 25 have a width substantially equal to the width of the side surfaces of the portions 17, and the upper and lower edge surfaces of the portions 25 and of the portions 17 are shaped to blend with the upper and lower surfaces of the adjacent end portion of the temple 18.

Figure 2:
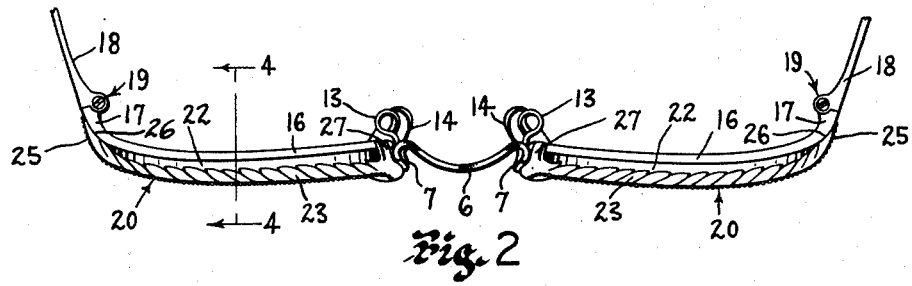
Fig. 2 is a top plan view of the device shown in Fig. 1.

To cause the end portions 25 to blend into the portions 17, the end surface of each of said portions 25 is formed with a curved contour surface portion 26, see Fig. 2, shaped substantially to the outer side surface shape of the adjacent portion 17 of the bar-like member and the said end portion 25 is secured to the portion 17 throughout the engaging area 26 of the end surface by soldering, welding or the like as stated above. The plate members 20, adjacent the nasal ends thereof, are provided with rearwardly extending spacer members 27 which are secured to the bar-like members 16 by soldering, welding or the like.

The plate members 20 and bar-like members 16, therefore, throughout the major portion of the length of the upper contour edges of the lenses are controlled as to their spaced relation so as to have a relatively intimate fit with the front and rear side surfaces of the lenses at said location while permitting free pivotal movement of the lenses about the connection means 10 as a center inwardly and outwardly of the channel formed by said plate member and bar-like member.

While the combined bar-like member 16 and plate member 20 provide a very rigid channel-like structure for receiving the upper contour edges of the lenses, the plate-like member 20 can be provided with any desired configuration or decorative surface treatment to introduce a desirable aesthetic effect. The parts of the mounting are carefully shaped and blended with each other not only to obtain the various mechanical features set forth above but to have a pleasing and desirable appearance. This is of extreme importance in the construction of ophthalmic mountings for, while it is possible to introduce several desirable mechanical features, they must be so constructed and assembled as to obtain a pleasing appearance when on the face of the wearer. This pleasing effect is one which has introduced much difficulty in structural designs of ophthalmic mountings and is obtained in the present construction without sacrifice of any of the desired mechanical features. The supporting structure is one which can be readily adjusted to lenses of different meniscus shapes without detracting from its desirable appearance and is one which accomplishes all of the desirable characteristics and objects of the invention.

Having described my invention, I claim:

1. A supporting structure for the lenses of an ophthalmic mounting, said structure comprising a central bridge having depending side portions and lens connection means carried thereby to which the nasal portion of said lenses may be secured, said lens connection means constituting the sole means by which the lenses are secured to the structure, a relatively long and slender bar-like member shaped to follow along the upper rear peripheral surface portion of each of said lenses from adjacent said lens connection means and terminating in outwardly and rearwardly extending temple hinge bearing portions, and a plate-like member shaped to follow along the upper front peripheral surface portion of said lenses, said plate-like members having a spacer portion adjacent the nasal end thereof extending rearwardly over the edge of the lens when assembled therewith and being secured to the bar-like member, and the temporal end portions of said plate-like members turning rearwardly and merging with the temple hinge bearing portions of said bar-like members in secured relation therewith to provide unitary relatively rigid channels fitting about the top portion of the lenses whereby relative displacement of said lenses and their supporting structure will be confined to substantially the direction of the plane in which the lenses are supported.

2. A supporting structure for the lenses of an ophthalmic mounting, said structure comprising a central bridge having depending side portions and lens straps carried thereby to which the nasal portion of said lenses may be secured, said lens straps constituting the sole connection for the lenses with said structure, a relatively long and slender bar-like member shaped to follow along the upper rear peripheral surface portion of each of said lenses from adjacent said lens straps and terminating in outwardly and rearwardly extending temple hinge bearing portions, and a plate-like member angled along its length to have a first portion shaped to follow along the upper front peripheral surface portion of each of said lenses, and a second longitudinal portion angled therefrom to overlie the top edge of the lenses, and a spacer portion carried by said plate-like members adjacent the nasal end thereof and extending rearwardly over the adjacent edge of the lens and secured to the bar-like portions and with the temporal end portions of said plate-like members turning rearwardly and being secured in side surface relation with the temple hinge bearing portions, said plate-like members with the bar-like members providing unitary relatively rigid channels in which the top portion of the lenses are confined to limit relative displacement between said lenses and the supporting structure to substantially the direction of the plane in which the lenses are supported.

3. An ophthalmic mounting comprising a pair of lenses having nasally disposed perforations, a central bridge carrying lens straps to overlie adjacent nasal portions of said lenses, pin-like means extending from said straps and into said perforations and constituting the sole means for connecting the lenses with the remaining parts of the mounting, and spring means carried by said lens straps resiliently acting on the adjacent edge of said lenses in a direction substantially normal to the direction in which said pin-like means are disposed, a relatively long and slender bar-like portion following the upper rear peripheral surface portion of each of said lenses from adjacent said lens straps and terminating in outwardly and rearwardly extending temple hinge bearing portions, and a plate-like member extending along the upper front peripheral surface portion of each of said lenses, said plate-like portions having a spacer portion adjacent the nasal end thereof extending over the edge of the lens and secured to the bar-like portions and said plate-like portions having temporal end portions turning rearwardly and merging with the temple hinge bearing portions in secured relation therewith to provide unitary relatively rigid channels in which the top portion of the lenses are seated, said top portion of the lenses being free to move in said channels about the pin-like means as a pivot under the action of said spring means and being restricted in movements transversely thereof.

4. An ophthalmic mounting comprising a pair of lenses, a central bridge having lens straps extending from opposed sides thereof in overlying relation with adjacent portions of the lenses, said lenses and lens straps being apertured with pin-like connection means extending therethrough, and cupped resilient members carried by said lens straps, said cupped resilient members being urged into resilient engagement with the adjacent edge of the lenses, a relatively long and slender bar-like member along the upper rear peripheral surface portion of each of said lenses from adjacent said lens straps and terminating in outwardly and rearwardly extending temple hinge bearing portions, and a plate-like member extending along the upper front peripheral surface portion of each of said lenses, said plate-like members having a portion deflected along its length to extend over and along the top edge of said lens, a rearwardly extending spacer portion carried by said plate-like members adjacent the nasal end thereof and secured to the bar-like members, the temporal end portions of said plate-like members turning rearwardly and merging with the temple hinge bearing portions of the bar-like members in secured relation therewith to provide unitary relatively rigid channels in which the top portions of the lenses are seated, said top portion of the lenses being free to move in the channels about the pin-like connection means as a pivot when urged by the cupped resilient members and being restricted against movement in directions transversely thereof.

EDWARD M. SPLAINE.

REFERENCES CITED

The following references are of record in the file of this patent:

UNITED STATES PATENTS

| Number | Name | Date |
| --- | --- | --- |
| 1,744,993 | Tamplin | Jan. 28, 1930 |
| 2,178,038 | Harbour | Oct. 31, 1939 |
| 2,208,356 | Bosworth | July 16, 1940 |
| 2,318,537 | Stolper | May 4, 1943 |
| 2,343,574 | Page | Mar. 7, 1944 |
| 2,383,021 | Splaine | Aug. 21, 1945 |
| 2,384,815 | Cozzens | Sept. 18, 1945 |
| 2,450,711 | Bouchard | Oct. 5, 1948 |